United States Patent

Blanchette et al.

(10) Patent No.: US 6,612,065 B1
(45) Date of Patent: Sep. 2, 2003

(54) FISHING ROD GUIDES, TOPS AND HOOK KEEPERS AND METHOD

(75) Inventors: Paul J. Blanchette, Burlington, CT (US); Robert P. Nadeau, Terryville, CT (US); Alan Gnann, Tolland, CT (US)

(73) Assignee: Ultimate NiTi Technologies, LLC, Bristol, CT (US)

( * ) Notice: Subject to any disclaimer, the term of this patent is extended or adjusted under 35 U.S.C. 154(b) by 0 days.

(21) Appl. No.: 09/787,805

(22) PCT Filed: Sep. 24, 1999

(86) PCT No.: PCT/US99/22249

§ 371 (c)(1),
(2), (4) Date: Mar. 23, 2001

(87) PCT Pub. No.: WO00/16613

PCT Pub. Date: Mar. 30, 2000

Related U.S. Application Data

(60) Provisional application No. 60/101,584, filed on Sep. 24, 1998.

(51) Int. Cl.[7] ............................................... A01K 87/04
(52) U.S. Cl. .............................................................. 43/24
(58) Field of Search .......................... 43/24, 25.2, 18.1

(56) References Cited

U.S. PATENT DOCUMENTS

| | | | | |
|---|---|---|---|---|
| 2,319,462 A | * | 5/1943 | Kruse | 43/24 |
| 2,398,862 A | * | 4/1946 | Sarkisian | 43/24 |
| 2,561,675 A | * | 7/1951 | Ross | 43/24 |
| 2,573,647 A | * | 10/1951 | Marke | 43/24 |
| 2,596,835 A | * | 5/1952 | Benge | 43/24 |
| 2,623,317 A | * | 12/1952 | De Maria | 43/24 |
| 2,702,959 A | * | 3/1955 | Wiglesworth | 43/24 |
| 2,718,085 A | * | 9/1955 | Bean | 43/24 |
| 2,721,412 A | * | 10/1955 | Smiley | 43/24 |
| 2,724,204 A | * | 11/1955 | Wiglesworth | 43/24 |
| 2,762,154 A | * | 9/1956 | Marke | 43/24 |
| 2,763,083 A | | 9/1956 | Lenz | 43/25.2 |
| 2,775,054 A | * | 12/1956 | Shinbane | 43/24 |
| 2,872,751 A | * | 2/1959 | Mayfield | 43/24 |
| 3,186,122 A | | 6/1965 | Clock et al. | 43/18.1 |
| 3,245,169 A | * | 4/1966 | Kennel | 43/24 |
| 3,303,595 A | * | 2/1967 | Wells et al. | 43/24 |
| 3,665,635 A | | 5/1972 | Lumbard | 43/25.2 |
| 4,070,785 A | * | 1/1978 | Hawk | 43/24 |
| 4,142,317 A | * | 3/1979 | Klein | 43/24 |
| 4,174,583 A | | 11/1979 | Ohmura | 43/24 |
| 4,893,429 A | | 1/1990 | Yamoto | 43/24 |
| 5,408,932 A | | 4/1995 | Hesse et al. | 102/501 |
| 5,953,847 A | * | 9/1999 | Peterson | 43/24 |
| 6,154,998 A | * | 12/2000 | Hashimoto et al. | 43/24 |
| 6,408,562 B1 | * | 6/2002 | Sunaga et al. | 43/24 |

FOREIGN PATENT DOCUMENTS

| | | |
|---|---|---|
| JP | 2-195801 | 7/1990 |
| JP | 3-236732 B1 * | 10/1991 |
| JP | 3-272634 A1 * | 12/1991 |
| JP | 5-70408 B1 * | 10/1993 |
| JP | 8-37998 B1 * | 2/1996 |
| JP | 10909153 A | 11/1998 |
| WO | WO 98/24309 | 6/1998 |

OTHER PUBLICATIONS

"Superelastic Ni–Ti Wire", Dieter Stoeckel and Weikang Yu, Mar. 1991, Wire Journal International, pp. 45–50.*

"The Story of Nitinol: The Serendipitous Discovery of the Memory Metal and Its Applications", George B. Kauffman and Issaac Mayo, 1996, The Chemical Educator vol. 2 No. 2, pp. 1–21.*

* cited by examiner

*Primary Examiner*—Darren W. Ark
(74) *Attorney, Agent, or Firm*—Alix, Yale & Ristas, LLP

(57) ABSTRACT

Fishing rod components such as guide (12), hook keepers (16), and tops (18) are formed from shape memory alloy materials such as nickel-titanium alloys and provide lighter weight coupled with improved performance, high flexibility and superelasticity.

17 Claims, 2 Drawing Sheets

FISHING ROD GUIDES, TOPS AND HOOK KEEPERS AND METHOD

RELATED APPLICATION

This application is the National Stage of International Application No. PCT/US99/22249, filed Sep. 24, 1999, which claims the benefit of Provisional Application No. 60/101,584, filed Sep. 24, 1998.

FIELD OF THE INVENTION

The present invention relates generally to fishing rod components and is more particularly concerned with new and improved fishing rod guides, tops and hook keepers.

BACKGROUND OF THE INVENTION

Guides, hook keepers and tops used on fishing rods are currently manufactured out of various types of stainless steel with a variety of coatings thereon that enhance both the cosmetic appearance of the components and the wearability thereof while beneficially decreasing the friction between the components and the fishing line. In addition to plating and other coatings being used to enhance the wearability and sliding mechanics, inserts made from metallic and ceramic materials are also used. These inserts, while providing better wearability and sliding mechanics, greatly increase the weight of the individual and cumulative guides on the rod. Typically, each rod carries from five to fifteen such guides as well as a tubular top member and hook keeper. These components vary in size and weight to accommodate the intended use of the fishing rod. Fishing enthusiasts generally prefer components of smaller size or gauge and of reduced weight. Unfortunately, lighter gauge material also is more susceptible to distortion, bending and breaking unless the rod is carefully handled. For example, when packing or transporting the rod it is possible to bend the fishing line guides inadvertently or accidentally, requiring that the guides be straightened, typically by cold working which tends to increase the brittleness of the material and therefore reduces the usable life of the guide component. In many cases the distortion of the stainless steel guides and tops is caused by the rod getting caught on branches and trees when walking through the woods and brush.

As mentioned, the fishing rod guides, hook keepers and tops currently manufactured further require a surface coating to enhance their wear characteristics. This coating is subject to chipping and normal wear during use and may require coating application processes such as plating processes that are environmentally unfriendly. As mentioned before, the drawback of the coating/insert process is the added weight. This is extremely important for several reasons. First, increased weight in a rod greatly reduces the feel (sensitivity) of the rod for the angler. The feel of the rod is very important in allowing the angler to react to what the fish is doing. Second, the added weight tends to dampen the action of the rod and reduce the line speed.

SUMMARY OF THE INVENTION

In accordance with the present invention, it has been found that new and improved fishing rod components of the type described can be manufactured so as to improve fishing rod performance and obviate many of the deficiencies noted hereinbefore with respect to the currently employed stainless steel and ceramic materials. These improved components are formed using lower density, higher strength shape memory alloy materials that provide comparable results while reducing the weight of the components by as much as 70% or more. The lighter weight, smaller diameter material allows the rod to bend more uniformly throughout its length and provides improved rod "feel"and performance. The material provides very high flexibility and returns to its original shape after repeated full flex deformations. In addition, the lighter gauge material, due to its hardness characteristic, exhibits better wearability and reduced friction while casting or retrieving the fishing line, all without the necessity for coatings or special surface treatments. The lighter weight, reduced gauge material accordingly provides improved performance without the adverse effect of chipping or wear while at the same time completely avoiding the environmentally unfriendly coating conditions required with stainless steel. The material exhibits a "drawn wire" surface smoothness having a coefficient of friction that is significantly reduced relative to a coated or plated surface. The guides will not break or bend out of position under normal use and can withstand repeated deformations under severe use.

These and related advantages and features of the invention are obtained by forming fishing rod components such as guides, hook keepers and tops from shape memory alloy materials. Among such materials, the nickel-titanium alloys (NiTi), sometimes referred to as Nitinol alloys are preferred., Such materials provide not only the improved rod performance sought by fishing enthusiasts but also have the advantageous feature of obviating the embrittlement characteristics evidenced upon repairing bends or other irregularities in stainless steel guides, hook keepers and tops.

The new and improved method of the present invention includes the use of the shape memory alloy material in these fishing rod components to impart these desirable characteristics. The shape memory provides ready return to the components' original configuration even if it gets caught on trees or brush.

The invention accordingly comprises the several steps and the relation of one or more of such steps with respect to each of the others and the article possessing the feature of construction, properties and relation of elements exemplified in the following detailed disclosure.

DETAILED DESCRIPTION OF THE INVENTION

Figure 1:
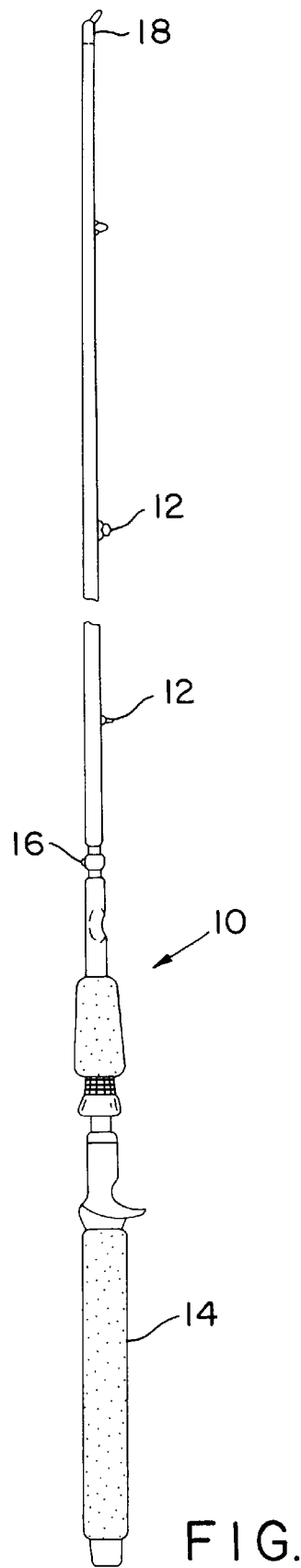
FIG. 1 is a plan view of a fishing rod mounting various components produced in accordance with the present invention.

Referring now to the drawings in greater detail wherein like reference numerals indicate like parts throughout the several figures, FIG. 1 illustrates a fishing rod 10 having mounted thereon a series of fishing line guides 12 spaced longitudinally along the length of the rod. A handle grip 14 is secured to one end of the rod and provides appropriate means for securing a reel thereto. Adjacent the handle end of the rod is a hook keeper 16 while the series of spaced guides 12 are fixedly positioned along the rod terminating with a tubular top 18 mounted on the free end thereof. The particular design, configuration or construction of the specific guides, tops and hook keepers may or may not significantly differ from the configurations used heretofore. The invention includes current and suggested new component designs with the utilization of shape memory alloy material in the fabrication of those rod components. Thus, the guide may take the configuration shown in greater detail in FIG. 2 or may be a variation thereof.

Figure 2:
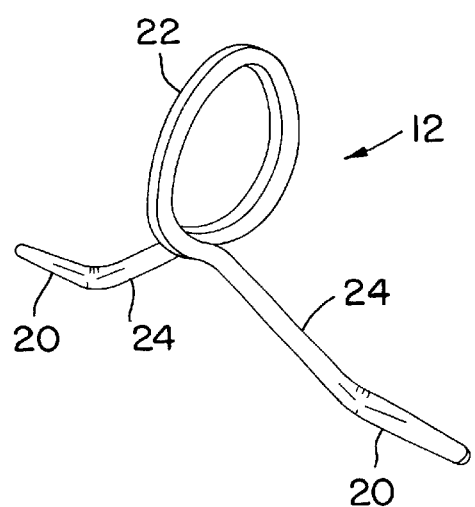
FIGS. 2 and 2A are enlarged perspective views of representative types of fishing rod guides used on the rod of FIG. 1.
Figure 2A:
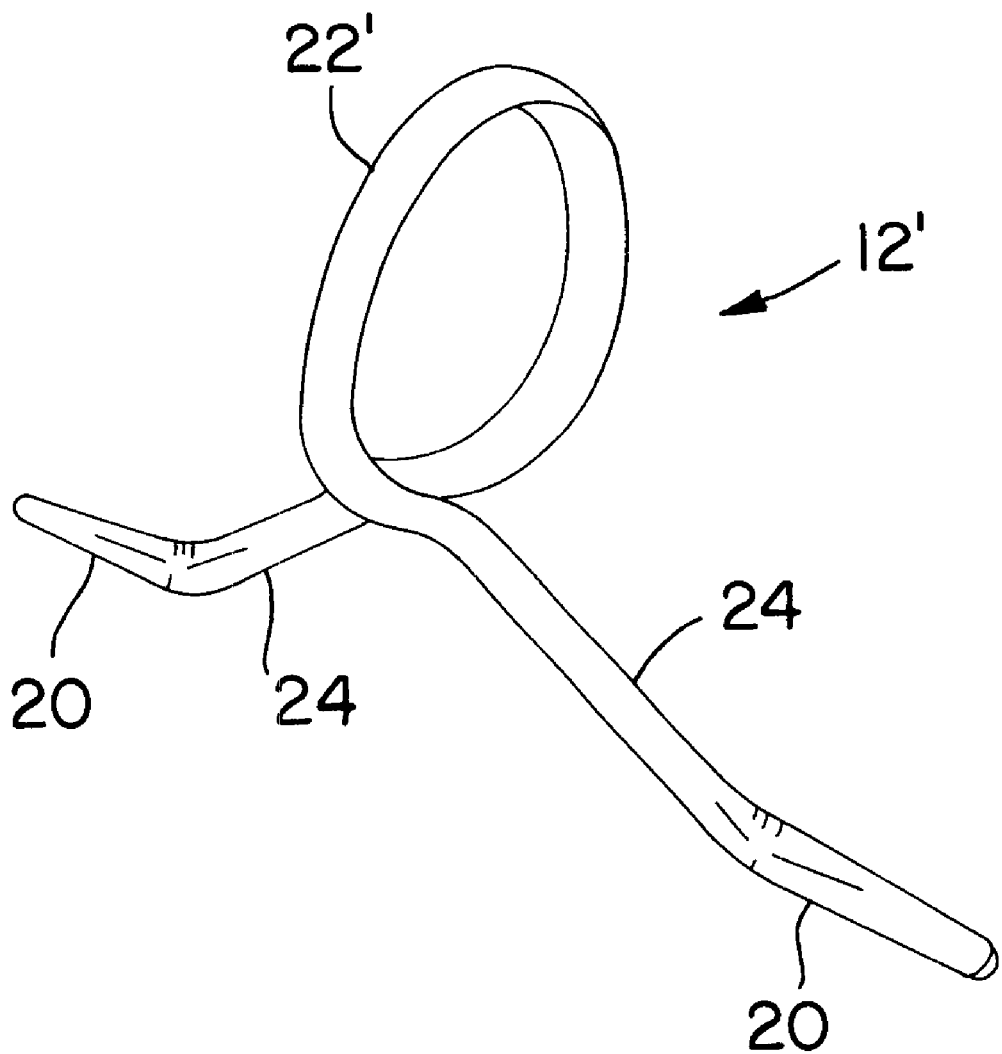

As shown in FIG. 2, the guide consists essentially of one or more base support portions 20 of elongated configuration that extend longitudinally and can be readily secured to the rod. In fact, using the shape memory material, single foot guides may be employed for the first time without concern for breakage. A line engaging guide ring portion 22 is supported in an elevated position relative to the base supports 20 by one or more leg members 24 extending from each base support member 20. The ring portion 22 is shown as consisting of a dual loop or coil of wire that is integrally continuous with the leg members 24 and base support 20. As will be appreciated, the invention is not limited to any specific construction and the guide may take a form having only a single base support, or form a simple single loop (best shown in FIG. 2A) or bent-wire snake guide or any other different guide configuration including welding or any other method of bonding two or more wires together to form a wire guide or tip top depending on the type of rod with which it is used, such as a fly rod, a spin casting rod, casting rod or a deep sea rod and may, of course, vary in both size and weight.

Figure 3:
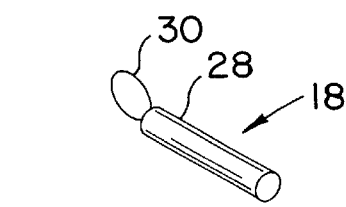
FIG. 3 is an enlarged perspective view of the terminal top member used on the rod of FIG. 1.

Similarly, the top 18 shown in FIG. 3 is of a simple tip-top design. However, it may be of a type used for casting, trolling, light spinning, deep sea or the like or may be of an all purpose configuration. The top 18 illustrated in FIG. 3 essentially consists of a hollow tubular member 28 adapted to slip over the end of the rod and a relatively small guide ring 30 projecting forward therefrom.

In accordance with the present invention, the fishing rod components are made from shape memory alloy material and, specifically, materials of the Nickel Titanium alloy type. The Nickel Titanium materials may be near stoichiometric intermetallic compounds of nickel and titanium or may include a variety of other elements which may include iron, copper, cobalt, aluminum and the like that will slightly alter the behavior of the material. The alloys have the ability to return to their defined shape or size when compressed or deflected. The shape memory recoverable strain typically is about 6.5–8.5%. The material can be temporarily plastically deformed at a relatively low temperature, and upon exposure to a higher temperature will return to its previously designed pre-deformation shape. The Nickel Titanium alloys typically have a lower specific gravity than the stainless steel heretofore used for guides. For example, a typical Nickel Titanium alloy has a specific gravity of about 6.45 grams per cc, while 304 Stainless Steel typically has a specific gravity of 7.84 grams per cc. Thus, for the volume of material employed, the shape memory material provides a significant weight advantage in that it is at least 15–20% lighter.

In its specific application for guides, hook keepers and tops for fishing rods, the Nickel Titanium alloys, due to their strength characteristic and their ability to facilitate repeated bending and rebending without increase in brittleness, facilitate the use of wire having a significantly narrower gauge. For example, stainless steel "snake" guides average about 0.037" in diameter while the Nickel Titanium alloy guide employs wire that is only about 0.020" in diameter, thus magnifying the reduction in weight for each component without sacrificing performance characteristics. In fact, these properties directly translate into a 70% reduction in moment of inertia and rod dampening. As a result, the rod remains crisp and true to its design after the components are mounted thereon. This lighter, finer gauge wire, along with the shape memory and pseudo elastic characteristics of the material, permits the fishing rod to flex more uniformly throughout its entire length. The rod action is significantly enhanced and the tip speed is greatly increased. This results in higher line speed and improved casting distance.

Additionally, as can be seen from the structure shown, particulary in FIG. 2, the various shapes and configurations of these particular guides can be designed from consistently wound wire forms with limited or no welding or soldering joints. This increases flexibility, enhances structural integrity, and reduces the possibility of breakage in the event the material is accidentally damaged, such as being crushed when packing for a trip or being caught in trees or otherwise subject to bending forces. The shape memory alloy materials facilitate the rapid repair of the guide so as to return it to its original shape without cold working and becoming brittle. For larger guides used on some spinning or deep sea rods, welding or other methods of bonding two or more wires together could be used. The temperature range over which the shape memory effect is observed is directly controlled by the precise ratio of the elements in the alloy. Thus, while a typical shape memory alloy may show the effect at temperatures between −200° C. and +100° C., a specific formulation will have a precise transition temperature range.

To ensure that the rod components exhibit pseudo-elastic characteristics above freezing, a defined % of cold work along with a precise heat treatment time at a particular temperature is carefully maintained during production.

As can be appreciated, the shape memory materials are significantly harder than existing stainless steel, are corrosion resistant and provide reduced line friction while casting or retrieving without the need for coatings or special surface treatments. This obviates any concern over the coating wearing away or the chipping that might occur on coated guide surfaces. At the same time the guides experience reduced wear. Additionally, the shape memory alloy materials facilitate the elimination of environmentally unfriendly manufacturing processes relating to coating and surface treatments. Finally, corrosion resistance is extremely important for salt water applications, as salt water will corrode guides made from stainless steel.

Due to the low coefficient of friction inherent with the Nickel Titanium alloy shape memory materials, it has been found that casting distance is improved and line wear reduced on fishing rods using guides made from these materials. The resultant increase in casting distance, of course, offers a significant performance advantage for fishing rods employing such components.

Another characteristic is the ability of the material to improve sliding mechanics when wet. As good as the material is in reducing friction when dry, when it is wet it is even better. Because the fishing line traveling through the guides is wet in most cases this feature of the material greatly increases the ability of the line to flow through the guides when wet.

Finally, in regard to the mechanics of fishing and throwing line the shape and configuration of the guides lend themselves to being custom made for right and left hand anglers. If the curvature of the guide is predominantly on the right side for a right handed angler then the same should be true for a left handed anger. This guide technology can apply here as well.

As will be apparent to persons skilled in the art, various modifications, adaptations and variations of the foregoing specific disclosure can be made without departing from the teachings of the present invention.

What is claimed is:

1. A pseudo-elastic fishing rod line guide fixable to an outside surface of a fishing rod comprising a support portion and a line engaging guide portion integral with the support portion, at least the guide portion being formed entirely of nickel titanium alloy material, wherein the support portion maintains the guide portion in a position radially spaced from the outside surface of the fishing rod when said line guide is mounted to the rod.

2. The fishing rod line guide of claim 1, wherein said nickel titanium alloy material has been heat treated and cold worked to impart pseudo-elasticity within a temperature range from 0°–50° C.

3. The fishing rod line guide of claim 1, wherein said guide portion comprises one or more loops of wire formed of said nickel titanium alloy material that has been formulated, heat treated and cold worked to produce pseudo-elasticity in the alloy.

4. A fishing rod component comprising a line engaging ring portion and an integrally extending support portion, both said ring portion and said support portion consisting of pseudo-elastic wireform shape memory alloy material, wherein said ring portion defines a line contact surface surrounding an inside circumference of said ring portion and said support portion is capable of supporting the ring portion on the outside surface of a fishing rod to which the component is fixable.

5. The fishing rod component of claim 4, wherein said support portion and said ring portion are formed from a single continuous length of said pseudo-elastic wireform shape memory alloy material.

6. A fishing rod incorporating a plurality of the fishing rod components of claim 4.

7. A fishing rod component for controlling and guiding a fishing line along a length of a fishing rod and radially spaceable from an outside surface of the rod when mounted to the outside surface of the rod, wherein the entire component is constructed of nickel titanium alloy material having pseudo-elastic properties, said component comprising a line engaging guide portion consisting of a dual loop of nickel titanium alloy wire.

8. A fishing rod line guide comprising a support portion and a line engaging guide portion integral with the support portion, the guide portion consisting essentially of one or more loops of nickel titanium alloy wireform material having pseudo-elastic properties, wherein the support portion of the line guide is fixable to an outside surface of the fishing rod to maintain said guide portion radially spaced from an outside surface of the fishing rod.

9. The fishing rod line guide of claim 8, wherein said one or more loops is a double loop.

10. A line guide fixable to an exterior surface of a fishing rod for controlling and guiding a fishing line along the fishing rod, said line guide comprising:

at least one base support configured for engagement with the exterior surface of the rod;

a line engaging guide portion consisting of a loop of a wire comprising a near stoichiometric intermetallic alloy of nickel and titanium having pseudo-elastic properties; and at least one support leg integrally connecting said at least one base support to the line engaging guide portion, wherein said at least one base support and said at least one support leg maintain said guide portion radially outwardly spaced from the exterior surface of the fishing rod when fixed thereon.

11. The line guide of claim 10, wherein said alloy has a recoverable strain of between 6.5% and 8.5%.

12. The line guide of claim 10, wherein said loop is a double loop.

13. The line guide of claim 10, wherein said at least one base support comprises two base supports and said at least one support leg comprises two support legs.

14. In combination, a fishing rod having a length and an exterior surface and a plurality of line guides fixed to the exterior surface for guiding a fishing line along the length of the fishing rod, each of said plurality of line guides comprising:

at least one base support fixed to the exterior surface of the rod;

a line engaging guide portion consisting of a loop of a wire comprising a near stoichiometric intermetallic alloy of nickel and titanium having pseudo-elastic properties; and at least one support leg integrally connecting said at least one base support to the line engaging guide portion, wherein said at least one base support and said at least one support leg maintain said guide portion radially outwardly spaced from the exterior surface of the fishing rod.

15. The combination of claim 14, wherein said alloy has a recoverable strain of between 6.5% and 8.5%.

16. The combination of claim 14, wherein said loop is a double loop.

17. The combination of claim 14, wherein said at least one base support comprises two base supports and said at least one support leg comprises two support legs.

* * * * *